(12) United States Patent
Lee

(10) Patent No.: US 6,638,566 B1
(45) Date of Patent: Oct. 28, 2003

(54) METHOD OF MANUFACTURING AN ELECTROCONDUCTIVE ANTIREFLECTION FILM AND A GLASS FACEPLATE WITH THE ANTIREFLECTION FILM FORMED THEREON

(75) Inventor: Chang Han Lee, Kyungsangbuk-do (KR)

(73) Assignee: Orion Electric Co., Ltd., Kyungsangbuk-do (KR)

( * ) Notice: Subject to any disclaimer, the term of this patent is extended or adjusted under 35 U.S.C. 154(b) by 0 days.

(21) Appl. No.: 09/980,605

(22) PCT Filed: May 19, 2000

(86) PCT No.: PCT/KR00/00495
§ 371 (c)(1),
(2), (4) Date: Nov. 15, 2001

(87) PCT Pub. No.: WO00/74103
PCT Pub. Date: Dec. 7, 2000

(30) Foreign Application Priority Data

May 31, 1999 (KR) .......................... 1999/19897

(51) Int. Cl.[7] .............. B05D 5/12; B05D 5/06
(52) U.S. Cl. .................... 427/64; 427/72; 427/164; 427/165
(58) Field of Search .............. 427/64, 66, 72, 427/164, 165, 168

(56) References Cited

U.S. PATENT DOCUMENTS

| | | | | | |
|---|---|---|---|---|---|
| 4,071,577 A | * | 1/1978 | Falender et al. | ............ | 525/479 |
| 5,742,119 A | * | 4/1998 | Aben et al. | ................. | 313/479 |
| 5,773,150 A | * | 6/1998 | Tong et al. | ................. | 428/429 |
| 6,084,040 A | * | 7/2000 | Jonas et al. | ................. | 525/535 |
| 6,391,227 B1 | * | 5/2002 | Yoon et al. | ................. | 252/500 |

* cited by examiner

*Primary Examiner*—Shrive P. Beck
*Assistant Examiner*—Michael Cleveland
(74) *Attorney, Agent, or Firm*—Notaro & Michalos P.C.

(57) ABSTRACT

The present invention provides a method of manufacturing an electroconductive antireflection film and a glass faceplate having the film of high electroconductivity, excellent antireflection characteristics and electromagnetically shielding characteristic with very high sticking strength and film hardness, etc., and formed at the lower manufacturing cost and in the simple manufacturing method. The method comprises the steps of: dissolving in alcohol an aqueous solution of organic polymer containing polyethylenedioxythiophene which polystyrenesulphonate is doped to; adding silicon alkoxide to the alcoholic solution for reinforcing adhesion; preparing an organic polymeric electroconductive solution by adding pure water and a basic catalyst for hydrolysis; and applying the electroconductive solution on the image display glass plate, thereby forming the polymeric electroconductive film as an antireflective film.

6 Claims, 1 Drawing Sheet

METHOD OF MANUFACTURING AN ELECTROCONDUCTIVE ANTIREFLECTION FILM AND A GLASS FACEPLATE WITH THE ANTIREFLECTION FILM FORMED THEREON

FIELD OF THE INVENTION

The present invention relates to a method of manufacturing an electroconductive antireflection film and a glass faceplate with the antireflection film formed thereon. In detail, it relates to an image display faceplate or a screen in a panel of a CRT, which is applied to on the surface of the glass plate with a film proper to improve the electrically charge-preventive or anti-static characteristics and the electromagnetically shielding characteristics of the surface of a glass plate such as the image display faceplate, and a method of manufacturing the electroconductive polymeric antireflection film.

Recently, a wide use of an anti-explosion type cathode ray tube allows a face cover glass to be unnecessary in a television receiver, a monitor, etc., regarding the prevention of electrostatic charge, thereby exposing the front portion of the cathode ray tube, and giving electric shock by charged electrical high voltage, to the person who comes access to the faceplate of the cathode ray tube. Furthermore, dust in air, particles, etc., are adhered to by the electric force, and accumulated on, the charged faceplate of the cathode ray tube, thereby having the image on the display faceplate difficult to see.

The cause of electrostatic charge as to the faceplate panel as one example of the glass plate is as follows. A thin and uniform aluminium film is deposited by vacuum on the phosphor screen structure on the interior surface of the faceplate panel. When an electric power is applied to, a high anode voltage is applied to the aluminium film. Electric charges generate on the exterior surface wall of the panel by electrostatic induction due to the high voltage of the inside aluminium film.

Electroconductive coatings are used as antistatic layers on display screens of display devices, in particular cathode ray tubes (CRTs). Said layers have a sheet resistance, for example, of $10^6$ to $10^{10}$ $\Omega/\square$ and are hence sufficiently electroconductive to ensure that a high electrostatic voltage present on the outside surface of the display screen is removed within a few seconds.

However, shielding from electromagnetic radiation is becoming ever more important. Cathode ray tubes, such as display tubes for TVs and monitor tubes, comprise a number of radiation sources which may be hazardous to the user's health if he is exposed to said sources for a long period of time. A substantial part of the electromagnetic radiation generated can be screened off with metal in a simple manner via the housing of the cathode ray tube. However, radiation emitted via the display screen may substantially add to the amount of radiation to which the user is exposed. This problem is solved by applying a well-conducting coating on the surface of the display screen. Said coating must also be sufficiently transparent in the wavelength range of from 400 to 700 nm, i.e. the transmission must be at least 60%. A well-known material which can be used for a transparent and well-conducting coating is indium-doped tin oxide (ITO). Such a layer can be provided by means of vacuum evaporation or sputtering. Said method requires, however, expensive vacuum equipment. ITO layers can also be manufactured by firing spin-coated or sprayed layers of solutions of indium-tin salts by means of a sol-gel process. Said firing operation should be carried out at a temperature of at least 300° C. This temperature is much too high to be used with a complete display tube which, in order to preclude damage to parts of the display tube, can withstand temperatures of maximally 160° C., thus this process being improper for such display tube.

Korean patent publication No. 2713 as one prior arts for providing an anti-static characteristics on the image display faceplate describes one such electroconductive coating formed by the steps of preparing a slurry by dispersing indium-doped tin oxide(ITO) into an alcohol solution of alkoxysilane Si(OR)4(R is an alkyl group), spraying the slurry on the faceplate panel, and heat-treating the sprayed panel at a relatively high temperature.

That is, such coating should be also heat-treated at a temperature of at least 300° C. in order to obtain sufficient electroconductivivity. However, such coating is improper for a CRT since damage causes in parts of the CRT at a temperatures above 160° C. And, to obtain low reflectivity effect, an additional low-reflective silica coating is required on the ITO coating, thereby, making the process for obtaining at least two coating layers complicated.

U.S. Pat. No. 5,742,119 issued to Aben, et al. on Apr. 21, 1998, discloses a display screen of a cathode ray tube provided with electroconductive antireflection coatings of a complicate structure as shown in FIG. 1. In FIG. 1, a cathode ray tube 1 has a glass envelope tube 2 comprising a display panel 3, a funnel 4 and a neck 5. In the neck 5, there is provided one (or three) electron gun(s) 7 for generating an electron beam, and an electroconductive coating 8 is provided on the outer surface of the panel 3, which is connected to the ground 9. On the electroconductive coating 8 is provided with three additional layers consisted of a first additional layer 10 of silicon dioxide, a second additional layer 11 of titanium dioxide and a third additional layer 12 of silicon dioxide.

However, the metallic oxide costs too much, thereby making the manufacturing cost very high. Furthermore, the problem is that while the metallic oxide exists dispersedly in the alcohol solution, deposition problem arises due to cohesion between the particles according the condition of the surroundings, thereby making spots or unevenness and lowering the electroconductivity.

Accordingly, it is one object of the present invention to provide a glass plate such as an image display faceplate having high-electroconductive and antireflective film which can be formed using electroconductive organic polymer in a simple method and at a low cost, and have an improved anti-static characteristic and an electromagnetically shielding characteristic with a strong film hardness and a strong adhesive strength. Also, the present invention provides a method of making such film.

SUMMARY OF THE INVENTION

To accomplish the aforementioned purpose, the present invention provides a method of manufacturing an image display glass plate, on the outside surface of which an polymeric electroconductive film is formed as an antistatic layer, the method comprising the steps of: dissolving in alcohol an aqueous solution of organic polymer containing polyethylenedioxythiophene which polystyrenesulphonate is doped to; adding silicon alkoxide to the alcoholic solution for reinforcing adhesion; preparing an organic polymeric electroconductive solution by adding pure water and a basic catalyst for hydrolysis; and applying the electroconductive solution on the image display glass plate, thereby forming the polymeric electroconductive film as an antireflective film.

The applying step is performed by spin-coating said electroconductive solution onto the image display glass plate, and then the polymeric electroconductive film is formed by heat-treating the spin-coated polymeric electroconductive film of the image display glass plate at a temperature of about 150° C. Said alcoholic solvent is of 30~90 wt. % and can be selected from a group consisting of a methanol, an ethanol, an isopropanol, a butanol, and combinations thereof.

In a preferred embodiment, said organic polymeric electroconductive solution contains polyethylenedioxythiophene of 0.03~0.50 wt. %, which polystyrenesulphonate is doped to, pure water of 5~70 wt. % and silicon alkoxide of 1~10 wt. %.

With such methode, the organic polymeric electroconductive film coated on the outside of the image display glass plate contains polyethylenedioxythiophene which polystyrenesulphonate is doped to, which is simply formed without any damage during its coating process and has excellent electroconductivity and antireflection.

DETAILED DESCRIPTION OF THE PREFERRED EMBODIMENT

Figure 1:
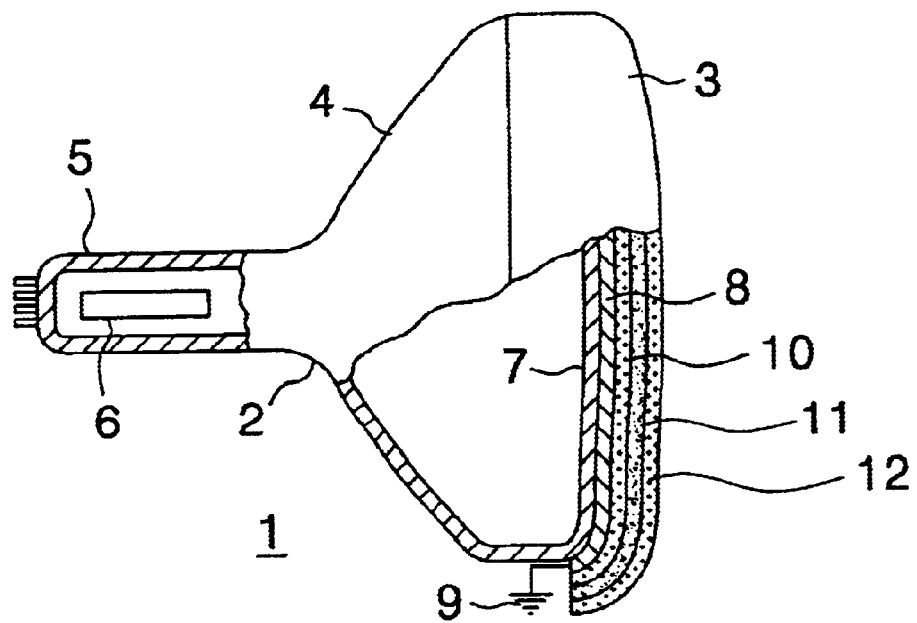
FIG. 1 is a schematical view, partly cut-away of a color cathode-ray tube, wherein a display screen is provided on the outside with electroconductive antireflection coating of multiple layers according to one prior art.

For a better understanding of the principle and nature of the present invention reference should be made to the following detailed description taken in connection with the accompanying drawing.

Exemplary Embodiment 1

An anti-static layer is formed on the outside surface of a faceplate panel 3 of a color cathode ray tube 1 as shown in FIG. 1. A grounded anti-explosion band 4 comes into contact with the anti-static film and makes the potential of the overall surface of the anti-static film a zero voltage.

The anti-static film according to the present invention is formed as follows.

An aqueous solution(PEDT/PSS aqueous solution) of polyethylene-dioxythiophene which polystyrene-sulphonate is doped to is dissolved in ethanol. Sequently, ethylsilicate $Si(OC_2H_5)_4$ as an adhesive agent is added to the aqueous solution, thereby an electroconductive aqueous solution being prepared. Then, for hydrolysis, constant amount of pure water is added and, for helping growth of the silica particles in the solution, a small amount of a basic catalyst such as ammonia is added. The result solution is mixed for more than 2 hours, thereby an. electroconductive anti-static solution being prepared. Thereafter, the electroconductive anti-static solution is aged for more than 2 weeks. Then, in an upward state of the outside surface of the faceplate panel of the color cathode ray tube 1, the color cathode ray tube 1 is rotated with around 150 rpm and the aged anti-static solution is dropped on the outside surface of the faceplate panel, thus the uniform thin anti-static film is formed. This spin-coating is completed for about 1 minute 10 seconds. Following this spin-coating, the anti-static film is completely formed by heat-treating it at about 150° C. for about 30 minutes.

The anti-static film has substantially low optical reflexibility as a porous film having microscopic pores.

The constituents and the contents of the electroconductive solution are as follows:

| CONSTITUENTS OF THE ELETROCONDUCTIVE ORGANIC POLYMERIC SOLUTION | CONTENT (wt. %) |
|---|---|
| PEDT/PSS aqueous solution (CONCENTRATION 1.3%) | 20.00 wt % |
| ETHYL SILICATE | 4.00 wt % |
| ETHANOL | 55.9 wt % |
| PURE WATER | 20.00 wt % |
| $NH_3$ | 0.1 wt % |

The results from the example above are as follows:

| | | |
|---|---|---|
| 1. | Surface resistivity: | $3.6 \times 10^3$ ohms/sq. ($\Omega/\square$) |
| 2. | Reflexibility: | 1.2% (at a wavelength of 550 nm) |
| 3. | Electric field: | |
| | ELF (extremely low frequency): | 4.1 V/m |
| | VLF (very low frequency): | 0.8 V/m |
| 4. | Film hardness: | 6H |

Exemplary Embodiment 2

The coating method is the same as that in Exemplary embodiment 1, but in the electroconductive solution, the content of PEDT/PSS aqueous solution (CONCENTRATION 1.3%) is changed. The constituents and the contents of the electroconductive solution are as follows:

| CONSTITUENTS OF THE ELETROCONDUCTIVE ORGANIC POLYMERIC SOLUTION | CONTENT (wt. %) |
|---|---|
| PEDT/PSS aqueous solution (CONCENTRATION 1.3%) | 40.00 wt % |
| ETHYL SILICATE | 4.00 wt % |
| ETHANOL | 35.9 wt % |
| PURE WATER | 20.00 wt % |
| $NH_3$ | 0.1 wt % |

In the Exemplary embodiment above, in which the content of PEDT/PSS aqueous solution is increased, the reflexibility is somewhat increased, but the film hardness is deteriorated compared with the Exemplary embodiment 1 as the followings:

| | | |
|---|---|---|
| 1. | Surface resistivity: | $3.1 \times 10^3$ ohms/sq. ($\Omega/\square$) |
| 2. | Reflexibility: | 1.4% (at a wavelength of 550 nm) |
| 3. | Electric field: | |
| | ELF (extremely low frequency): | 4.1 V/m |
| | VLF (very low frequency): | 0.7 V/m |
| 4. | Film hardness: | 4H |

Exemplary Embodiment 3

The coating method is the same as that in Exemplary embodiment 1, but in the electroconductive solution, the content of PEDT/PSS aqueous solution (CONCENTRATION 1.3%) is remarkably decreased. The constituents and the contents of the electroconductive solution are as follows:

| CONSTITUENTS OF THE ELETROCONDUCTIVE ORGANIC POLYMERIC SOLUTION | CONTENT (wt. %) |
|---|---|
| PEDT/PSS aqueous solution (CONCENTRATION 1.3%) | 2.00 wt % |
| ETHYL SILICATE | 4.00 wt % |
| ETHANOL | 72.9 wt % |
| PURE WATER | 20.00 wt % |
| $NH_3$ | 0.1 wt % |

In the Exemplary embodiment above, in which the content of PEDT/PSS aqueous solution is remarkably decreased, the film hardness is improved, but the electroconductivity is substantially decreased as the followings:

| | | |
|---|---|---|
| 1. | Surface resistivity: | $5.7 \times 10^5$ ohms/sq. ($\Omega/\square$) |
| 2. | Reflexibility: | 1.1% (at a wavelength of 550 nm) |
| 3. | Electric field: | |
| | ELF (extremely low frequency): | 4.6 V/m |
| | VLF (very low frequency): | 2.5 V/m |
| 4. | Film hardness: | 7H |

Exemplary Embodiment 4

The coating method is the same as that in Exemplary embodiment 1, but in the electroconductive solution, the content of pure water is decreased and HCl is used as an acid catalyst instead of the basic catalyst. The constituents and the contents of the electroconductive solution are as follows:

| CONSTITUENTS OF THE ELETROCONDUCTIVE ORGANIC POLYMERIC SOLUTION | CONTENT (wt. %) |
|---|---|
| PEDT/PSS aqueous solution (CONCENTRATION 1.3%) | 20.00 wt % |
| ETHYL SILICATE | 4.00 wt % |
| ETHANOL | 71.9 wt % |
| PURE WATER | 4.00 wt % |
| HCL | 0.1 wt % |

In the Exemplary embodiment above, in which the electroconductive solution is prepared on the condition of the acid catalyst, the reflexibility was high, thereby failing to lower the reflexibility as the followings:

| | | |
|---|---|---|
| 1. | Surface resistivity: | $4.4 \times 10^3$ ohms/sq. ($\Omega/\square$) |
| 2. | Reflexibility: | 2.9% (at a wavelength of 550 nm) |
| 3. | Electric field: | |
| | ELF (extremely low frequency): | 4 3 V/m |
| | VLF (very low frequency): | 0.8 V/m |
| 4. | Film hardness: | 7H |

As found from the above-described Exemplary embodiments, it is preferred that the electroconductive antistatic film according to the present invention is formed by spin-coating onto the image display glass plate 7 a polymeric electroconductive solution containing polyethylenedioxythiophene of 0.03~0.50 wt. %, which polystyrenesulphonate is doped to, an alcoholic solvent of 30~90 wt. %, pure water of 5~70 wt. %, silicon alkoxide of 1~10 wt. %, and then by heat-treating the spin-coated polymeric electroconductive film of the image display glass plate 7 at a temperature of about 150° C. Also, it is preferable that the basic catalyst is used.

The electroconductive film formed by the method above has the electroconductivity below 5 K ohms/sq. ($\Omega/\square$) corresponding to the TCO standard, wherein the intensity of the electric field below 10 V/m in the frequency range of 50 Hz~2 KHz (ELF) and below 1 V/m in the frequency range of 2~400 KHz (VLF) is required when measured in the distance of 0.3 m. Moreover, the above-described electroconductive film can have by itself an optical reflexibility below 1.5% in the range of visible green wave length due to the porous film structure having microscopic pores.

As found from the Exemplary embodiment above, the effect of low optical reflexibility can be obtained together with an excellent electroconductivity due to the porosity of the film formed in a single layer by spin-coating and then heat-treating the single layer at the low temperature.

While, in order to lowering the reflexibility in the prior art ITO coating method, the films of at least two layers should be formed and, in order to obtain an excellent electroconductivity, the films should be heat-treated at the high temperature, the present invention has advantages that the method of manufacturing the film can be simplified and no damage is caused to the CRT during the manufacturing process.

As understood from the above-described embodiments, the present invention enables forming an anti-static coating on a general glass plate having high electroconductivity, excellent antireflection characteristics and electromagnetically shielding characteristic with very high sticking strength and film hardness, etc., at the lower manufacturing cost and in the simple manufacturing method.

It should be clear to one skilled in the art that the present invention can be altered and applied without any limitation to the aforementioned embodiments of the present invention and within the scope of the present invention's spirit.

What is claimed is:

1. A method of manufacturing an image display glass plate, on the outside surface of which an polymeric electroconductive film is formed as an antistatic layer, the method comprising the steps of:

dissolving in alcohol an aqueous solution of organic polymer containing polyethylenedioxythiophene which polystyrenesulphonate is doped to;

adding silicon alkoxide to the alcoholic solution for reinforcing adhesion;

preparing an organic polymeric electroconductive solution by adding pure water and a basic catalyst for hydrolysis; and applying the electroconductive solution on the image display glass plate, thereby forming the polymeric electroconductive film as an antireflective film.

2. A method according to claim 1, wherein the applying step is performed by spin-coating said electroconductive solution onto the image display glass plate, and then the polymeric electroconductive film is formed by heat-treating the spin-coated polymeric electroconductive film of the image display glass plate at a temperature of about 150° C.

3. A method according to claim 1 or claim 2, wherein said alcoholic solvent is of 30~90 wt. % and selected from a group consisting of a methanol, an ethanol, an isopropanol, a butanol, and combinations thereof.

4. A method according to claim 1 or claim 2, wherein said organic polymeric electroconductive solution contains polyethylenedioxythiophene of 0.03~0.50 wt. %, which polystyrenesulphonate is doped to.

5. A method according to claim 1 or claim 2, wherein said organic polymeric electroconductive solution contains pure water of 5~70 wt. %.

6. A method according to claim 1 or claim 2, wherein said organic polymeric electroconductive solution contains silicon alkoxide of 1~10 wt. %.

* * * * *